Figure 4:
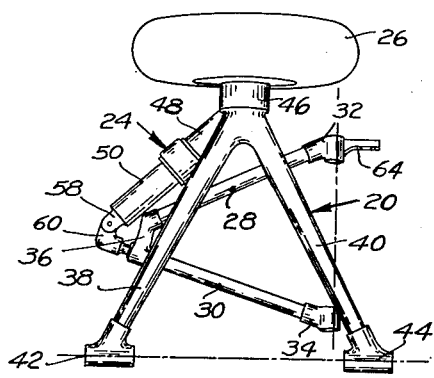

April 24, 1951      E. C. WELLS      2,550,028

RETRACTABLE LANDING GEAR

Filed May 25, 1948      3 Sheets-Sheet 1

INVENTOR.
EDWARD C. WELLS
BY Reynolds & Beach

ATTORNEYS

INVENTOR.
EDWARD C. WELLS
BY
Reynolds + Beach
ATTORNEYS

April 24, 1951     E. C. WELLS     2,550,028
RETRACTABLE LANDING GEAR
Filed May 25, 1948     3 Sheets-Sheet 3
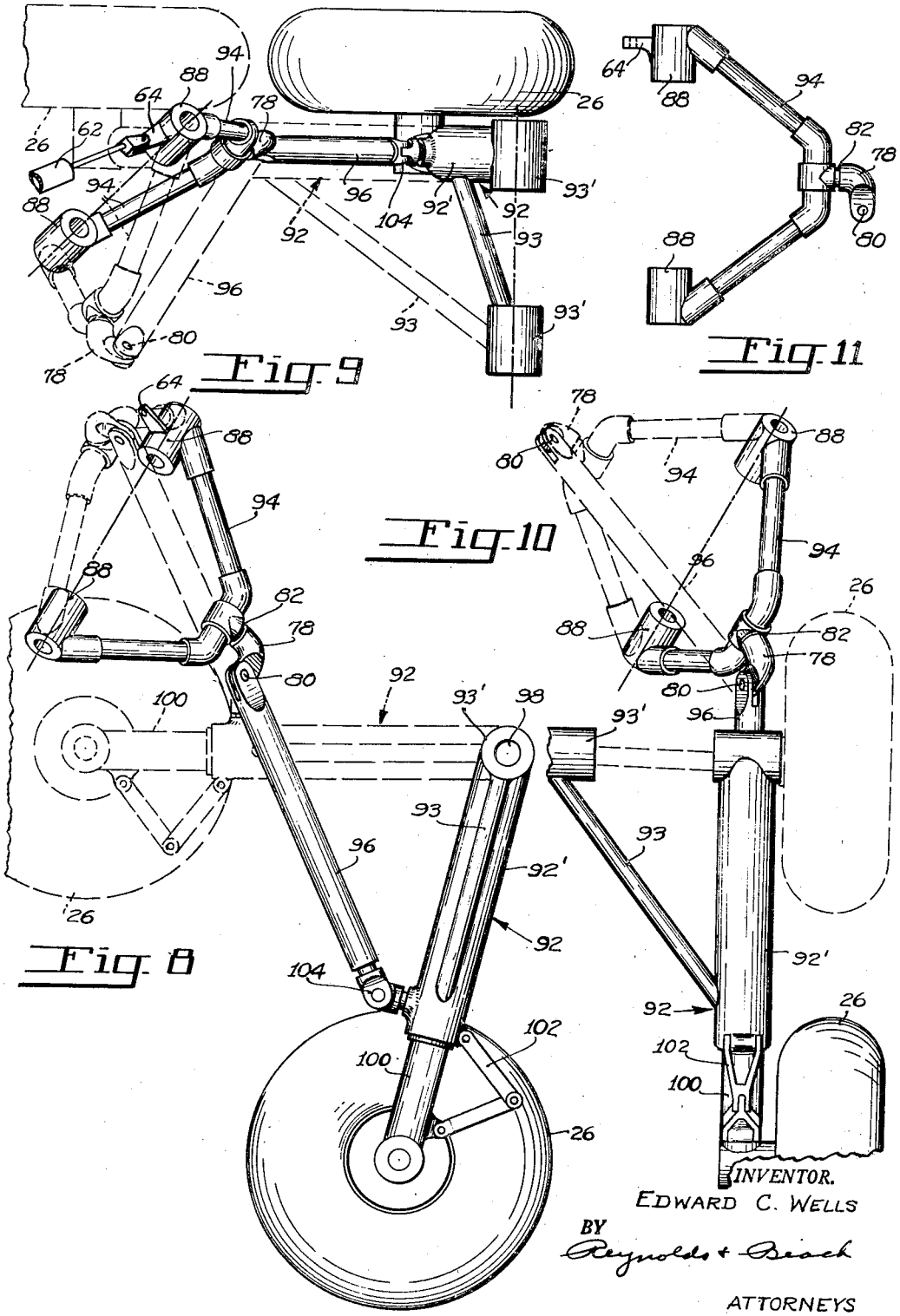
INVENTOR.
EDWARD C. WELLS
BY Reynolds & Beach
ATTORNEYS Patented Apr. 24, 1951

2,550,028

UNITED STATES PATENT OFFICE 2,550,028

RETRACTABLE LANDING GEAR

Edward C. Wells, Seattle, Wash., assignor to Boeing Airplane Company, Seattle, Wash., a corporation of Delaware Application May 25, 1948, Serial No. 28,991

25 Claims. (Cl. 244—102)

This invention relates to airplane rectractible landing gear, and has for its principal object a landing gear which is particularly compact, sturdy, and well-suited for installation in restricted spaces, such as in the sides of the fuselage of a small aircraft, or in the wing nacelles of larger ones. By reason of the form and arrangement of its parts such a landing gear may be raised and lowered with minimum effort, and when lowered into operating position, is easily held there against forces which tend to cause its folding up. Of equal consideration are the factors of its simplicity and reliability in operation.

In one of its herein illustrated forms, all of the landing gears parts are shifted inboard of the aircraft during retracting movement, to concentrate their weight near the center of gravity of the aircraft fuselage during flight, and yet, when extended, they establish the desired spread or spacing between the wheels or other landing elements. In this form of the invention the gear-receiving opening in the aircraft fuselage or nacelle is formed entirely in its side, leaving the bottom unobstructed to be used for loading bays or for various equipment.

In two other herein illustrated forms of the invention the landing gear is designed with its parts arranged primarily for installation in the bottom portion of a fuselage or wing nacelle. Such installations are intended primarily for heavy, fast-flying aircraft, but the same advantages of compactness, simplicity and reliability are desirable here also. In these modified forms, the landing wheel rises and falls directly in its own plane and does not swing substantially outward as in the preceding case. The landing gear's structural elements are more nearly aligned generally in a vertical plane and fore and aft of the aircraft when lowered so as to increase their ability to withstand drag loads, whereas in the first-described case the elements are arranged in outrigger fashion.

According to the invention, my improved landing gear comprises a first supporting member which swings generally vertically for retraction and extension of the gear, a second supporting member swingable generally horizontally in the first form of landing gear and at a substantial angle of incline in the modified forms, and finally a link member interconnecting the swinging ends of the two members named to coordinated their movements and to cooperate with them structurally. Depending upon the particular form, the different three structural landing gear elements divide the landing-drag, and weight loads in selected manner. The structural element in each case which is disposed more nearly vertical than the others when lowered, upward from the wheel, is designated to embody the shock-absorbing mechanism, whereas the remaining elements act in other structural capacities, transmitting loads to the aircraft frame.

The various features and advantages of the invention, including various details concerning the illustrated forms of my improved landing gear, will become further apparent from the following description based upon the accompanying drawings.

Figure 2:
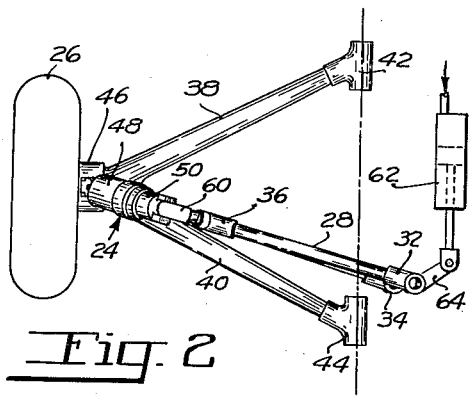
Figure 3:
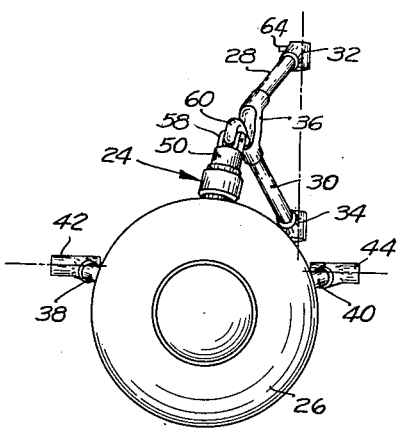
Figure 1:
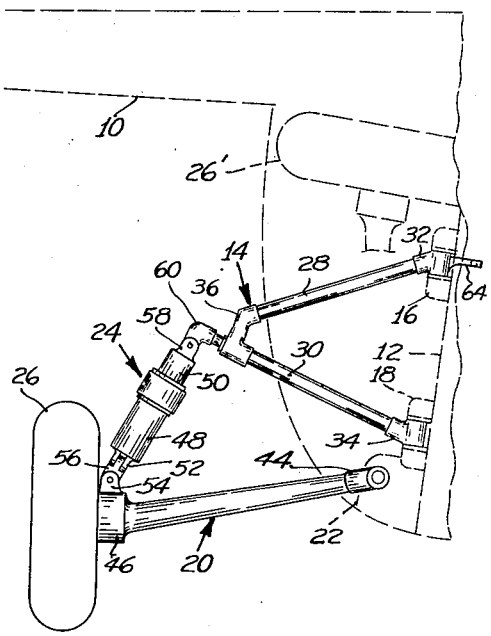

Figure 1 is an end elevation view of a first form of the landing gear, wherein the landing wheel swings generally inward and upward when retracted from operative position; Figure 2 is a plan view of the same form of landing gear; Figure 3 is a corresponding side elevation view thereof; and Figure 4 is a side elevation view with the landing gear retracted.

Figure 5:
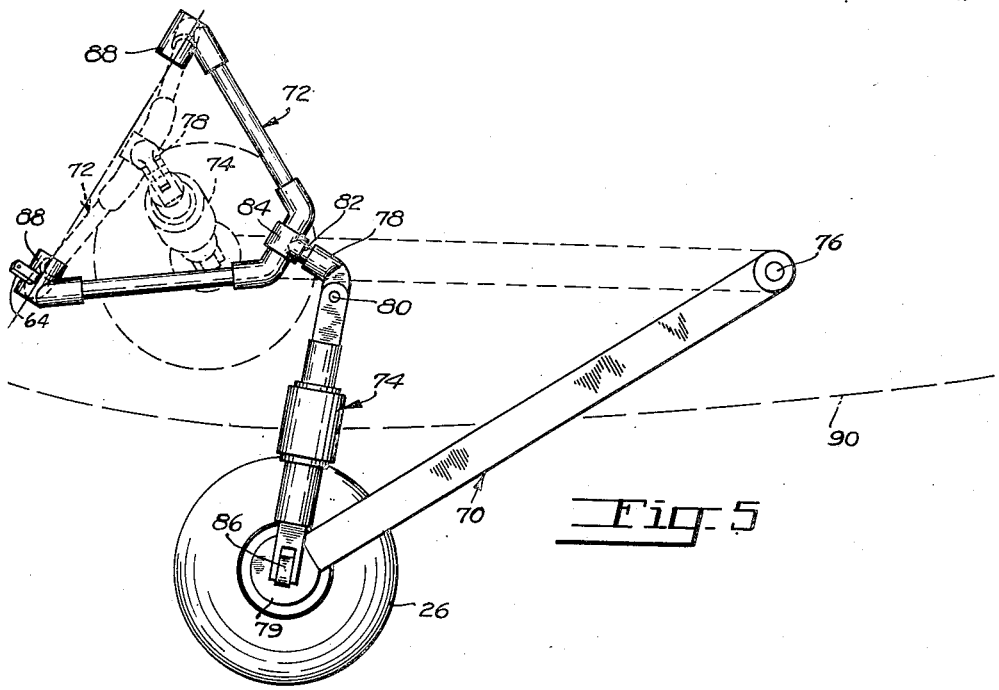
Figure 6:
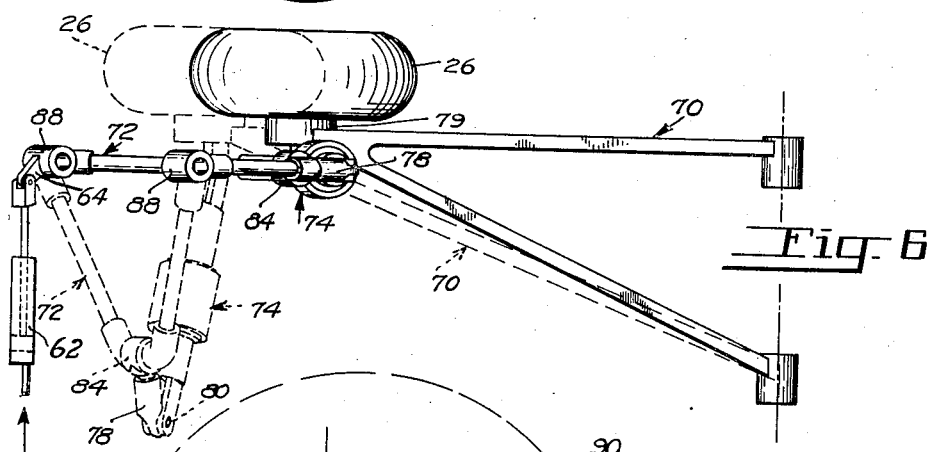

Figure 5 is a side elevation view of a modified form of my landing gear wherein the wheel is swung upward along a vertical fore and aft arc, when retracted from its illustrated position shown in solid lines into its raised position shown in broken lines; Figure 6 is a corresponding plan view; whereas Figure 7 is a front elevation view of the landing gear when retracted into the confines of a wing nacelle or similar structure.

Figure 7:
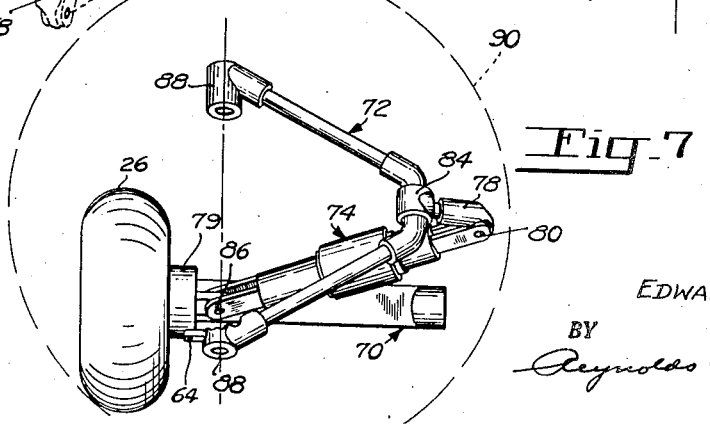

Figure 8 is a side elevation view of a further modified form of the landing gear, which is a modification of the type shown in Figures 5 to 7, and is shown in both solid and dotted lines in its operative and retracted positions, respectively; Figure 9 is a corresponding plan view of the same landing gear; Figure 10 is a corresponding front elevation view of the same; and Figure 11 shows one of the landing gear elements detached from the others, viewed normally to its general plane.

In the first-described form of the invention (Figure 1 et seq.) the three landing gear structural members swing into compactly folded relation when retracted, so that they may easily be stored within the side of the nacelle or fuselage. In general, two of the structural members, struts, or trusses, however they may be designated, are pivoted to the aircraft frame to swing about mutually perpendicular axes, one generally horizontal and the other generally vertical. The third member constitutes a supporting link interconnecting the swinging ends of the trusses. Since it becomes more nearly vertical than the others, when the landing gear is lowered, the link element is the one best adapted to embody the shock-absorbing mechanism.

More specifically, in Figure 1 the dotted line 10 could designate generally the cross-sectional outline of either a high-wing monoplane aircraft, or the wing and wing nacelle of a heavy aircraft of the transport or bomber class. A storage compartment or recess is formed in the side of the nacelle or fuselage for receiving the retracted landing gear elements. The compartment has an inner wall 12 shown inclined upwardly and inwardly at a slight angle from vertical. One of the landing gear structural elements comprises the truss or strut 14 swingable about an upright axis defined by its pivot supports 16 and 18 appropriately secured to the airplane frame at locations spaced vertically along the compartment wall 12. In its preferred construction the strut 14 is of the V type, comprising a pair of divergent tubular arms 28 and 30 carrying at their inner, spaced ends fittings 32 and 34 engaging the strut mountings 16 and 18, respectively. At the strut's apex or swinging end, the ends of arms 28 and 30 are rigidly interconnected by the V-shaped fitting 36. The arms are of approximately equal length so that they form substantially an isosceles triangle whose third side comprises a line parallel to wall 12.

A strut or truss 20 coacting with truss 14 is pivotally connected to mounting means 22 at the base of the landing gear compartment, at locations spaced apart fore and aft of the airplane and spaced outwardly from the wall 12. The truss 20 swings in a vertical arc about a substantially horizontal axis, which is disposed, therefore, generally perpendicular to the pivot axis of truss 14. Strut 20 is also preferably of the V type, comprising the pair of tubular arms 38 and 40 carrying at their inner ends fittings 42 and 44 pivoted coaxially to the supporting means 22, as best seen in Figures 2 and 3. The members 38 and 40 are joined at their strut-apex or swinging ends, and together carry a journal support for axle 46 of landing wheel 26. Strut 20 thereby constitutes a wishbone or Y strut. Since arms 38 and 40 are substantially equal in length, together with the axis of their pivots they also generally form an isosceles triangle, as best seen in Figures 2 and 4. The mid-point of the base side of this triangle parallel to the compartment wall 12 is offset forwardly of the swing axis of strut 14. The wheel axle 46 preferably departs in its axial direction slightly from the plane of the truss 20, so that it may be held approximately horizontal while the lowered truss slopes downward slightly from its pivoted end on the aircraft, affording belly clearance.

The swinging outer ends of the struts 14 and 20 are pivotally interconnected by a link 24, which embodies suitable shock-absorbing means. While the outer end of strut 20 is shown as carrying the landing wheel 26, the wheel might alternatively be mounted on the link. Link 24 transmits its compression load directly to strut 14 secured to the aircraft frame, whereas strut 20 is the one which resists landing wheel drag loads when the gear is extended. The pivot axis of strut 14 preferably is offset somewhat forwardly of the plane in which the outer end of strut 20 swings during retracting, as stated, so that when strut 14 swings rearwardly its outer end does not move excessively from the plane of swing of strut 20, thereby enabling strut 14 to exert a more direct inward and upward pull of link 24 on strut 20. Were the axis of strut 14 not thus offset forwardly, either that strut would be too short to locate the link 24 nearly vertical in the extended position of the landing gear, or the swinging end of such strut would be located too far rearward when the landing gear is nearly in its retracted position to render it efficient to pull link 24, which would be disposed more nearly horizontal than shown in Figure 4. Also with the axis of strut 14 thus offset forwardly, when the landing gear is lowered the link 24 and its shock absorber are disposed nearly vertically to enable effective action of the shock absorber when subjected to landing loads. In this position of the link, it is generally parallel to the rotative axis of the brace truss 14.

The shock absorber incorporated in link 24, interconnecting the swinging ends of the struts 14 and 20, preferably comprises telescoping tubular elements 48 and 50 containing suitable coacting shock absorbing mechanism, such as an oleo gear of conventional type, or a coil spring and suitable damping means. The link is connected to the struts 14 and 20 at both ends by universal joints. At its lower end, the outer tubular member 48, having connecting lugs 52, is interconnected with lugs 54 on the wheel mounting 46 by a coupling link 56 pivotally connected at its opposite ends, respectively, to the two sets of lugs by mutually perpendicular pins. Correspondingly, the upper end of the inner tube 50 has lugs 58 connected by a pin to the end of a swivel connector 60 rotatively received in tube 30 to turn about the axis of such tube, or pivoted to the apex of truss 14 in an equivalent manner, so that the axes of rotation of connector 60 relative to truss 14 and link 24 are mutually perpendicular.

While landing gear retraction may be effected by various types of actuators, constituting no essential part of the present invention, I have illustrated a hydraulic piston and cylinder mechanism 62 as a representative device for swinging strut 14 between the position of Figure 3, projecting laterally outward, and that of Figure 4 swung rearwardly into position alongside the plane. Such actuator is connected to the swinging end of a lever 64 integral with the strut 14 but disposed at the side of its pivot axis opposite the strut proper. Because the link 24 interconnects the struts, such swinging of the upper strut effects swinging of the lower strut 20 upwardly into position alongside the airplane fuselage in overlapping or folded relation to the strut 14, wherein both struts together occupy a relatively small space. In Figure 1 the landing wheel 26 is shown in retracted position by dotted line 26', whereas in Figure 4 the landing gear in retracted position is seen looking toward the side of the airplane.

The details of the hydraulic actuator 62 are not shown, for a hand crank and suitable linkage, or an electric motor and appropriate gearing and lines might be used instead. Also means for locking the landing gear in its retracted and operating positions are omitted inasmuch as various means may be provided to gain the desired ends. A double acting hydraulic cylinder and piston arrangement, as shown, itself will constitute locking means for retaining strut 14 either in its outwardly projected or inwardly swung position, as desired.

It will be observed, and has been stated, that the pivot axis of the strut 14 is offset forwardly of the plane in which the apex of strut 20 swings, as most clearly appears in Figures 2 and 3. Consequently full retraction of the landing gear may be accomplished without excessive lengthening of the shock absorber in such link as the compression load of the airplane is removed and such link assumes the weight of the landing wheel. By such expedient the inward pull on link 24 is greatly increased as fitting 56 swings upward above connector 60, to continue the upward swinging of strut 20 so that its swinging end cuts across the plane in which the end of strut 14 swings, without the application of excessive force on link 24, or the production of large loads in the members.

Inasmuch as the trusses 14 and 20 are of generally flat construction, and the shock absorber as illustrated may be relatively thin, in their retracted relation the several members occupy only a small space which may be easily provided within the general contour of the fuselage. Moreover, the shock absorber link 24 in its retracted position lies alongside, instead of being sandwiched between, the struts 14 and 20.

Like the first illustrated form of the landing gear, in its second illustrated form (Figure 5) the landing gear link 74, which interconnects the swinging structural members 70 and 72, embodies the shock-absorbing means. Strut 70 swings about a horizontal axis extending athwartships, causing the landing wheel 26 which it carries to rise and fall in its own vertical plane, swinging in an arc generally fore and aft of the aircraft. In its lowered position strut 70 forms an acute angle with the horizontal, whereas link 74 is nearly vertical. Compression load in the link preventing upswing of strut 70, is borne by structural member 72 disposed generally coplanar with the link and the plane of swing of strut 70. The pivot axis of member 72 is inclined from the vertical, so as to cause its link-connected end to rise and fall along an inclined arc extending generally athwartships. In the illustrated case the pivots for this member lie generally over and forward of the wheel in lowered position, and are spaced very appreciably forward of the swing axis of strut 70.

The member 70 is formed preferably as a V truss whose sides converge forwardly from the spaced pivots 76. Such a truss prevents lateral deflection of the lowered landing wheel caused by sideward loads but need carry no substantial portion of the vertical load, which is carried by the other members. However, it takes substantially all of the drag load, since link 74 is nearly vertical and is pivoted at its ends to the two structural members. The landing wheel 26 is journaled in sleeve 79 supported at the apex of strut 70. In lowered position, the incline angle of strut 70 may be of the order of thirty or forty degrees, although the angle will depend upon a particular installation design.

The truss member 72 is preferably also V-shaped, pivoted for swinging about spaced pivot members 88. A universal coupling connector 78 interconnects the apex or swinging end of truss 72 and the upper end of link 74 for relative swinging of the elements in all directions. One end of the connector pivots about a horizontal pin 80 connecting it to the upper end of the link 74, whereas its other end pivots about a short shaft section 82 secured by the fitting 84 to the apex of the truss 72. The lower opposite end of link 74 is likewise connected for universal rotation with respect to strut 70, such as by means of a pinned connection 86 suitably adapted to swivel about an axis coincident with or parallel to the axis of wheel 26. Link 74 is therefore adapted to assume a folded relation to both struts when the landing gear is raised.

In raising the landing gear by swinging truss member 72 about pivot members 88, sidewardly and upwardly, raising strut 70 and the wheel 26, the landing wheel is lifted to a greater height within the base of the wing nacelle or fuselage 90 than would be possible were the member 72 to swing about a vertical axis. Moreover, the force required to effect such retraction is made less thereby.

Because of the incline of the swing axis of truss 72, strut 70, when raised, is disposed generally horizontal, so that with the gear even in fully retracted position the point of connection of link 74 with the swinging apex end of truss 72 is still well above its connection with the apex end of strut 70, although the mechanical advantage is not as great with the elements retracted, by swinging truss 72 to raise the landing wheel, as it is during their initial movement from lowered position. However, the reduction in mechanical advantage is compensated in large measure by the reduction in wind load on the wheel during raising, especially when it moves into the nacelle airfoil and is shielded from the wind. The retracting mechanism therefore experiences no extreme variations in load during retracting operations.

With the landing gear lowered, the truss member 72 and shock-absorbing link 74 become generally vertically aligned for carrying maximum load. Yet, when retracted, they fold together compactly, and, together with strut 70, occupy comparatively little otherwise usable space in the lower portion of the nacelle. The heightwise extent of the folded landing gear elements is also made small because only a slight elevating of the upper end of link 74 is required to effect the necessary lifting of the wheel.

Whereas the form of landing gear in Figures 5 to 7 employs a variable length or shock-absorbing link interconnecting the swinging strut ends, in the further modified form of my landing gear shown in Figures 8 to 10, the link 96 is fixed in length and the shock-absorbing mechanism is carried by or embodied in the more upright truss 92, corresponding to strut 70. Member 92 therefore becomes the principal landing leg, carrying most of the vertical load, and, it happens, also some of the landing wheel drag load. It is also designed to prevent lateral deflection of the wheel 26 on landing. Link 96 and truss 94 assume most of the drag load by tension in the link, and a small fraction of the weight load of the aircraft. As a further modification over the preceding form, swinging truss member 94, corresponding to the member 72, rotates about an axis which is inclined, not only fore and aft, but in the athwartships direction as well. This further decreases the effort required to retract the landing gear into fully upraised position by swinging truss 94, because the link's upper end rises at a faster rate, relative to its lower end, than before.

Landing leg tube 92' is joined near its lower end by a diagonal brace 93 having a pivot support 93' coaxial with the pivot support 98 of the landing leg tube 92'. A universal type connector 104 interconnects the lower ends of tube 92' and link 96. The link's upper end is pin connected to elbow connector 78 which swivels about its connection to the fitting 82 secured in the apex end of truss 94, likewise for universal movement of the link and truss 94 between their full line and broken line positions, lowered and retracted, respectively.

Carrying the wheel 26, the post or piston 103 cooperates with tube 92 in an interconnecting shock absorbing mechanism of any suitable conventional type. It is held anti-rotationally by a linkage 102 secured to the landing leg tube 92' so that the wheel remains constantly oriented in a fore and aft vertical plane.

In this further modified landing gear, although less retractive effort is required at the final stages in swinging truss 84, if that be the mode of retraction, yet a somewhat greater otherwise useful vertical space is occupied by the retracted gear in the nacelle than before. However, the length of leg 92 is less than corresponding strut 79, providing compensation for the loss of vertical storage space, by way of a reduction in storage space occupied fore and aft of and within the nacelle.

I claim as my invention:

1. A retractable landing gear for an airplane, comprising supporting mechanism including two elongated supporting members, means guiding said members for swinging about adjacent axes disposed at an angle relative to each other, and a link interconnecting the swinging ends of said members and operable to effect swinging of one member by swinging of the other member, said link and one of said supporting members constituting compression elements to form a landing leg structure projecting downward from the aircraft with the landing gear extended, and a ground-engaging element carried by said supporting mechanism at the lower end of the projected landing leg structure and movable between extended and retracted positions by such swinging of said elongated members.

2. A retractable landing gear for an airplane, comprising supporting mechanism including two elongated supporting members, means guiding said members for swinging about adjacent axes mutually substantially perpendicular, and a link interconnecting the swinging ends of said members and operable to effect swinging of one member by swinging of the other member, said link and one of said supporting members constituting compression elements to form a landing leg structure projecting downward from the aircraft with the landing gear extended, and a ground-engaging element carried by said supporting mechanism at the lower end of the projected landing leg structure and movable between extended and retracted positions by such swinging of said elongated members.

3. A retractable landing gear for an airplane, comprising supporting mechanism including an elongated member, means supporting said elongated member for swinging about a generally horizontal axis, a second elongated member, means supporting said second elongated member for swinging about an upright axis adjacent to the axis of said first elongated member, and a link interconnecting the swinging ends of said elongated members and operable to effect upward swinging of said first elongated member by swinging of said second elongated member from a position extending transversely of the axis of said first elongated member toward parallelism with such axis, and a ground-engaging element carried by said supporting mechanism and movable from extended position into retracted position by such upward swinging of said first elongated member.

4. A retractable landing gear for an airplane, comprising an elongated member, means supporting said elongated member for swinging of one end thereof about a generally horizontal axis, a ground-engaging element carried by such swinging end of said elongated member, a second elongated member, means supporting said second elongated member for swinging of one end thereof about an upright axis adjacent to the axis of said first elongated member, and a link interconnecting the swinging ends of said elongated members and operable to effect upward swinging of said first elongated member by swinging of said second elongated member from a position extending transversely of the axis of said first elongated member toward parallelism with such axis, thus to move said ground-engaging element from extended position into retracted position.

5. Mechanism comprising two elongated members, separate hinge means adjacent to each other supporting said elongated members for swinging respectively about adjacent axes disposed substantially mutually perpendicular, for projection of said elongated members from the same sides of said respective hinge means, and means interconnecting said elongated members and operable to coordinate the swinging thereof between positions in which each of said elongated members extends transversely of the axis of swing of the other member into positions where each of said elongated members extends substantially parallel to the axis of swing of the other of said elongated members.

6. Mechanism comprising a first elongated member, hinge means adjacent to each other supporting said elongated member for swinging of an end thereof substantially in a plane and about an axis, a second elongated member, hinge means supporting said second elongated member for swinging of an end thereof in a plane generally parallel to the axis of swing of said first elongated member and offset from said latter axis of swing for projection of said elongated members from the same sides of said respective hinge means, and means interconnecting the swinging ends of said elongated members and coordinating swinging thereof to effect movement of such swinging end of said first elongated member from one side to the other of the plane in which such swinging end of said second elongated member swings, during swinging of said second elongated member from a position disposed transversely of the axis of swing of said first elongated member toward parallelism with the axis of swing of said first elongated member.

7. Retracting mechanism comprising a first elongated member, means supporting said elongated member for swinging of an end thereof substantially in a plane and about an axis, a second elongated member, means supporting said second elongated member for swinging of an end thereof in a plane generally parallel to the axis of swing of said first elongated member and offset therefrom and about an axis adjacent to said first axis and generally parallel to but offset from the plane in which the swinging end of said first elongated member swings, and means interconnecting the swinging ends of said elongated members and coordinating swinging thereof to swing said first elongated member through approximately a right angle from one side to the other of the plane in which such swinging end of said second elongated member swings, during swinging of said second elongated member through approximately a right angle from a position, corresponding to the extended position of the mechanism, in which its swinging end lies in the plane of swing of such swinging end of said first elongated member, into a position, corresponding to the retracted position of the mechanism, in which it lies generally parallel to the axis of swing of said first elongated member with the two elongated members and the interconnecting means occupying a mutually folded relationship generally parallel to a common plane.

8. A retractable landing gear for an airplane, comprising two elongated members, means supporting said members and guiding them for swinging about axes mutually substantially perpendicular, between landing-gear retracted position and landing-gear extended position, a landing wheel carried by the swinging end of one of said members, and a link pivotally interconnecting and coordinating swinging of said members, the respective supporting means for said members being so disposed relative to one another that said members each function as struts to carry compression load in the extended position of the landing gear.

9. A retractable landing gear for an airplane, comprising two trusses, means supporting and guiding said trusses for swinging about axes mutually substantially perpendicular, a landing wheel carried by the swinging end of one of said trusses, and a link pivotally interconnecting the swinging ends of said trusses, the respective supporting means for said trusses being so located and relatively disposed that said link transmits, by compression therein, a portion of the airplane load between said trusses.

10. A retractable landing gear for an airplane, comprising two struts, means supporting and guiding said struts for swinging through substantially right angles about axes mutually substantially perpendicular, a landing wheel carried by the swinging end of one of said struts, and a link pivotally interconnecting the swinging ends of said struts, the respective supporting means for said trusses being so located and relatively disposed that said link transmits, by compression therein, a portion of the airplane load between said trusses.

11. A retractable landing gear for an airplane, comprising two struts, means supporting and guiding said struts for swinging about axes mutually substantially perpendicular, the axis of one of said struts extending substantially transversely of the longitudinal axis of the airplane and the axis of the other of said struts extending substantially longitudinally of the airplane, a link pivotally interconnecting the swinging ends of said struts, and a wheel carried by the swinging end of said other of said struts, said supporting means being so located and relatively disposed that each of said struts and said link become loaded in compression by weight of the airplane supported by the landing gear.

12. A retractable landing gear for an airplane, comprising two substantially planar, triangularly formed trusses, means guiding said trusses for swinging about axes mutually substantially perpendicular, the axis of one of said trusses being upright and the axis of the other of said trusses extending substantially longitudinally of the airplane, a link pivotally interconnecting the swinging apex ends of said trusses, and a wheel carried by the swinging end of said other of said trusses.

13. A retractable landing gear for an airplane, comprising a bifurcated strut having its bifurcations pivotally mounted on the airplane for swinging about an upright axis between a position projecting laterally from the airplane and a position folded alongside the airplane, a wishbone strut having its bifurcations pivotally mounted on the airplane for swinging about an axis extending longitudinally of the airplane between a lowered, laterally extended position and a raised retracted position alongside the airplane, a link pivotally interconnecting the root of the bifurcations of said bifurcated strut and the root of the bifurcations of said wishbone strut, and a landing wheel carried by the projection of said wishbone strut directed oppositely from its bifurcations.

14. The landing gear defined in claim 13, in which the upright axis about which the bifurcated strut swings is offset appreciably from the plane in which the projection of the wishbone strut swings generally longitudinally of the airplane.

15. The landing gear defined in claim 14, in which the upright axis about which the bifurcated strut swings is offset forwardly of the plane in which the projection of the wishbone strut swings.

16. The landing gear defined in claim 13, in which the link is variable in length and incorporates a shock absorber.

17. Aircraft landing gear comprising two elongated members, means supporting said elongated members and guiding them for swinging respectively about axes disposed one horizontally and the other generally upright, said one member being supported from the aircraft, in depending position, means pivotally interconnecting said elongated members and operable to coordinate swinging thereof, said respective supporting means being so located and relatively disposed as to guide said members for swinging between a position in which said interconnecting means and the one of said elongated members which swings about an upright axis are generally coplanar, and a position in which said depending member is raised into substantially horizontal position, and a ground-engaging element carried by said mechanism and movable from extended position into retracted position by such upward swinging of said first elongated member.

18. Retracting mechanism comprising a first elongated member, means supporting said elongated member for swinging of an end thereof in a generally vertical plane and about an axis, to move such end between upper retracted and lower extended positions, a second elongated member, means supporting said second elongated member for swinging of an end thereof in a plane at an incline and generally transversely of the plane of swinging of said first elongated member, means interconnecting the swinging ends of said elongated members and coordinating swinging thereof to swing said first elongated member upward during generally upward swinging of said second elongated member, from a position of said second elongated member disposed transversely of the axis of swing of said first elongated member toward parallelism with the axis of swing of said first elongated member and into generally parallel relationship with said interconnecting means.

19. A retractible landing gear for an airplane, comprising two struts, means guiding said struts for swinging about axes which are mutually substantially perpendicular, the axis of one of said struts extending substantially transversely of the longitudinal axis of the airplane and being substantially horizontal, and the axis of the other of said struts extending generally transversely of the longitudinal axis of the airplane and being upright with respect thereto, a link interconnecting the swinging ends of said struts, and a wheel carried by the swinging end of said one of said struts.

20. A retractible landing gear for an airplane, comprising two substantially planar, triangularly formed trusses, means guiding one of said trusses for swinging about an axis substantially horizontal and transverse of the airplane, means guiding the other of said trusses for swinging about a pivot axis generally upright and located above, and spaced forwardly in the aircraft with respect to, said first named axis, a link pivotally interconnecting the swinging apex ends of said trusses, and a wheel carried by the swinging end of said one of said trusses.

21. A retractible landing gear for an airplane, comprising two substantially planar, triangularly formed trusses, means guiding one of said trusses for swinging about an axis substantially horizontal and transverse of the airplane, means guiding the other of said trusses for swinging about a pivot axis generally upright, inclined with respect to the longitudinal axis of the aircraft, and located above and spaced forwardly in the aircraft with respect to, said first-named axis, a link pivotally interconnecting the swinging apex ends of said trusses, and a wheel carried by the swinging end of said one of said trusses.

22. A retractible landing gear for an airplane, comprising two substantially planar, triangularly formed trusses, means guiding one of said trusses for swinging about an axis substantially horizontal and transverse of the airplane, means guiding the other of said trusses for swinging about a pivot axis generally upright, inclined with respect both to the longitudinal and transverse axes of the aircraft, and located above and spaced forwardly in the aircraft with respect to, said first-named axis, a link pivotally interconnecting the swinging apex ends of said trusses, and a wheel carried by the swinging end of said one of said trusses.

23. A retractible landing gear for an airplane, comprising a V strut having its base end pivotally mounted on an airplane for swinging about an upright axis inclined to the longitudinal axis of the airplane, a wishbone strut having its base end pivotally mounted on the airplane for swinging about an athwartships axis spaced rearwardly of the pivotal mounting of said V strut, between a lowered, downwardly and forwardly extending position and a raised position more nearly horizontal, a link pivotally interconnecting the swinging ends of said struts, and a landing wheel carried by the swinging end of said wishbone strut.

24. A retractible landing gear for an airplane, comprising a V strut having its base end pivotally mounted on an airplane for swinging about an upright axis inclined to both the longitudinal and transverse axes of the airplane, a wishbone strut having its base end pivotally mounted on the airplane for swinging about an athwartships axis spaced rearwardly of the pivotal mounting of said V strut, between a lowered, downwardly and forwardly extending position and a raised position more nearly horizontal, a link pivotally interconnecting the swinging ends of said struts, and a landing wheel carried by the swinging end of said wishbone strut.

25. A retractable landing gear for an aircraft, comprising supporting mechanism including an elongated member, means on said aircraft supporting said member for swinging, about a generally horizontal axis, between retracted position directed generally upward and extended position directed generally outward and downward, means operable so to swing said elongated member comprising a second elongated member, means supporting said second elongated member to swing generally fore and aft of the aircraft, about an upright axis, means interconnecting said second elongated member and the first elongated member to effect swinging of the latter by swinging of the former, the respective support means for the elongated members being so located that such members assume a mutually overlapped relationship upon swinging into retracted position of the first elongated member by the second such member, and ground engaging means carried by one of the elongated members for retraction and extension thereby.

EDWARD C. WELLS.

REFERENCES CITED

The following references are of record in the file of this patent:

UNITED STATES PATENTS

| Number | Name | Date |
|---|---|---|
| 1,716,736 | Reilly | June 11, 1929 |
| 1,825,128 | Rowntree | Sept. 29, 1931 |